Jan. 11, 1966  W. WORTHMANN  3,228,475
WINDMILL

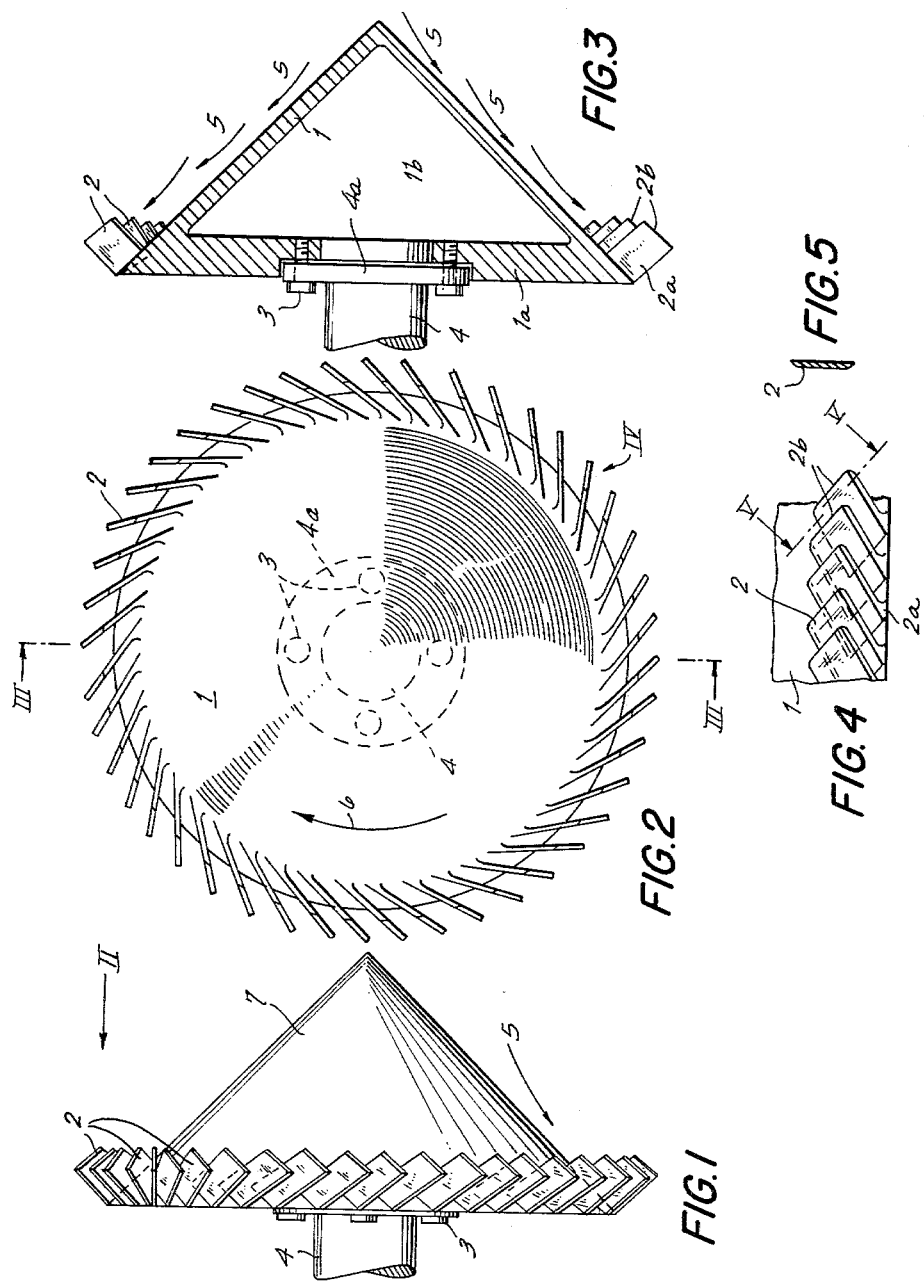

Filed Nov. 6, 1962  2 Sheets-Sheet 2

INVENTOR.
WILHELM WORTHMANN

_United States Patent Office_

3,228,475
Patented Jan. 11, 1966

3,228,475
WINDMILL
Wilhelm Worthmann, Lindenallee 115, Hanstedt,
Kreis Harburg, Germany
Filed Nov. 6, 1962, Ser. No. 235,686
Claims priority, application Germany, Nov. 30, 1961,
W 31,169
5 Claims. (Cl. 170—79)

The present invention relates to a machine which converts the wind's energy to work, and more particularly to a windmill which is known as wind wheel or wind turbine wheel. Still more particularly, the invention relates to a wind wheel which is especially suited for generating electricity in land-, and water- and aircraft.

Windmills of different designs are known for centuries. Many conventional machines of this general character utilize large blades or sails which must be reefed in high winds. Furthermore, such machines must be provided with brakes to be stopped in high winds which means that the wind's energy is not utilized at the time when such energy could produce more work than under ordinary circumstances. The torque produced by the action of wind is transmitted by gearing or by other types of transmissions which consume considerable energy.

Accordingly, it is a important object of the present invention to provide an exceptionally simple, very compact and lightweight windmill which need not be braked in high winds, which can transmit motion without resorting to transmissions and other expensive and energy-consuming torque transmitting mechanisms, and which can be put to many different uses.

Another object of the invention is to provide a wind mill of the just outlined characteristics which is especially suited for use as a means for transmitting torque to current generating units in all types of conveyances and which will perform satisfactorily in high winds as well as under normal operating conditions.

A further object of the invention is to provide a windmill which is constructed and assembled in such a way that it may transmit torque directly to the dynamo of a conveyance or to another current generating device so that the customary transmission may be dispensed with.

With the above objects in view, the invention resides in the provision of a windmill, particularly a wind wheel of the type which may be utilized as a means for transmitting torque to the dynamo or to another type of current generating means in a land-, water- or aircraft. This wheel comprises a hub having a substantially plate-like discoid base and a preferably hollow conical mantle which is rigid or integral with the base, a plurality of rather closely adjacent inclined vanes projecting from the mantle in close proximity of the base, and a driven shaft one end portion of which is preferably detachably secured to the base so as to be coaxial with the hub. This shaft transmits torque directly to the dynamo or to another apparatus which receives energy from the wheel.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a side elevational view of a wind wheel which embodies my invention;

FIG. 2 is a top plan view of the wind wheel as seen in the direction of arrow II in FIG. 1;

FIG. 3 is an axial section through the hub of the wind wheel as seen in the direction of arrows from the line III—III of FIG. 2;

FIG. 4 is an enlarged fragmentary developed view of the wind wheel as seen in the direction of the arrow IV in FIG. 2;

FIG. 5 is a transverse section through a vane as seen in the direction of arrows from the line V—V of FIG. 4.

Figure 6:
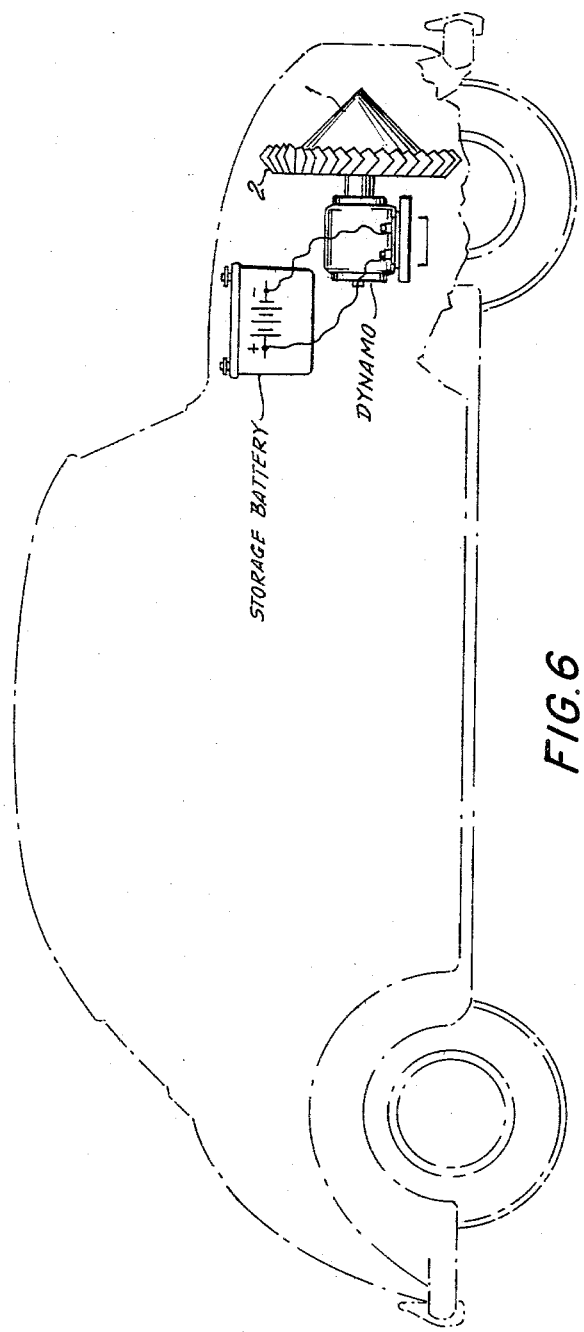
FIG. 6 is a windmill fixed on a vehicle.

Referring now in greater detail to the drawings, and first to FIGS. 1 to 3, there is shown a wind wheel which comprises a hollow hub including a discoid base 1a which is integral with a hollow conical mantle 1. The base 1a is surrounded by a series of inclined vanes or blades 2 which may form integral parts of the hub and which form a ring about the base. The hub transmits torque to a driven shaft 4 which is coaxial with and one end portion of which is detachably connected to the base 1a by screw bolts 3. These bolts extend through an annular flange 4a which is integral with the shaft and which is accommodated in a central recess provided at the outer side of the base 1a. The shaft 4 may drive an electric generator such as the dynamo of a land-, water- or aircraft. The arrows 5 indicate the direction of air streams when the wheel is mounted in such a way that its mantle 1 faces the wind. Such streams drive the wheel in a clockwise direction, as viewed in FIG. 2 (arrow 6). The streams of air flowing about the mantle 1 and toward the blades 2 are actually condensed while advancing toward the periphery of the base 1a. The conical chamber 1b defined by the mantle 1 and base 1a is fully enclosed.

If the wheel is mounted in such a way that the exposed side of the base 1a faces the wind, suction will develop about the mantle 1 which contributes to the efficiency of the machine.

FIG. 4 shows that the roots 2a of the blades 2 are reinforced at points immediately adjacent to the outer side of the mantle 1, and FIG. 5 shows that the blades are of trapeziform cross section.

Very good results were obtained with comparatively small wind wheels with a diameter of 12 inches or thereabout. As shown, a wind wheel of such diameter may transmit torque without any transmissions, i.e., its hub is directly coupled to the driven shaft. The speed at which the shaft 4 is driven is directly proportional to the wind force.

The dimensions of the blades 2 are but a fraction of the diameter of the base 1a. It will be noted that the outer edge portions 2b of the blades 2 are substantially parallel with the outline of the mantle 1, i.e., these edge portions are disposed on the periphery of a conical frustum which is substantially concentric with the exposed side of the mantle. The blades 2 have leading edge portions facing the apex of the conical mantle, and these leading edge portions are substantially perpendicular to the outline of the mantle 1, i.e., they lie in the surface of an imaginary cone coaxial with the mantle but oppositely directed with respect thereto and intersecting the mantle. This imaginary cone has a surface substantially perpendicular to the mantle.

The entire wind wheel preferably consists of suitable metallic material but it is equally possible to make the wheel of wood or of synthetic plastic.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A windmill, particularly for use in land-, water- and aircraft, comprising a hub having a substantially plate-like base and a hollow conical mantle which has an exposed side arranged to face the wind and which is integral with said base, said mantle and said base defining between themselves a chamber; a plurality of closely adjacent and overlapping inclined vanes extending from said mantle in close proximity of said base so as to form a ring about the base and to drive the hub when the exposed side of the mantle is placed in the wind, each of said vanes having an outer edge portion which is substantially parallel with the outline of said mantle and a leading edge portion which is substantially perpendicular thereto; and a driven shaft having an end portion coaxially secured to said base.

2. A windmill, comprising a hub having a substantially plate-like discoid base and a hollow conical mantle which has an exposed side arranged to face the wind and which is integral with said base said mantle and said base defining between themselves a chamber; a plurality of closely adjacent trapezoidally shaped inclined vanes arranged to overlap each other when viewed in the direction of the wind and being rigidly secured to and projecting from said mantle in close proximity of said base so as to form a ring about the base and to drive the hub when the exposed side of said mantle is placed in the wind, each of said vanes having a leading edge portion which is substantially perpendicular to the outline of said mantle; and a driven shaft having an end portion coaxially secured to said base.

3. A windmill as set forth in claim 2, wherein said driven shaft is detachably connected to said base, the connection between said shaft and said base comprising an annular collar provided on the end portion of said shaft and received in a central recess formed in said base, and bolt means extending through said collar and into said base.

4. In a vehicle, in combination, a rotary current generator; a wind-wheel arranged to drive said current generator when the vehicle is in motion, said wind-wheel comprising a hub arranged to rotate about a fixed axis and including a base and a conical mantle having an exposed side which faces the wind when the vehicle is in motion, said mantle and said base defining between themselves a substantially enclosed chamber, and a plurality of closely adjacent inclined blades extending from said mantle in close proximity of said base so that the blades form a ring about the base and that the blades are driven by the wind to rotate the hub when the vehicle is in motion, said mantle having a continuous surface between adjacent blades and each of said blades having a leading edge portion substantially perpendicular to the outline of said mantle and the spacing of said blades being such that they overlap each other so that substantially all the wind passing through said plurality of closely adjacent blades will impinge on said blades; and a driving connection between said wind-wheel and said current generator, said connection comprising a shaft rigid with said base and coaxial with said mantle.

5. The combination set forth in claim 4, wherein the shaft is directly connected with said current generator.

References Cited by the Examiner

UNITED STATES PATENTS

| | | | |
|---|---|---|---|
| 954,404 | 4/1910 | Trimble | 170—159 |
| 988,523 | 4/1911 | Toles | 244—39 |
| 1,341,653 | 6/1920 | Lee | 170—159 |
| 1,342,206 | 6/1920 | Hansen | 170—40 |
| 1,622,844 | 3/1927 | Ray | 244—39 |
| 1,851,857 | 3/1932 | Marney | 244—58 |
| 2,260,786 | 10/1941 | Muhlenbruck | 170—159 |
| 2,849,197 | 8/1958 | Rabinow et al. | 244—58 |
| 3,069,116 | 12/1962 | Ward | 244—58 |

FOREIGN PATENTS

| | | |
|---|---|---|
| 864,471 | 1/1941 | France. |
| 975,539 | 10/1950 | France. |
| 372,134 | 5/1932 | Great Britain. |

MARK NEWMAN, *Primary Examiner.*

MILTON BUCHLER, JULIUS E. WEST, *Examiners.*